US012701128B2

(12) United States Patent (10) Patent No.: US 12,701,128 B2

Wang et al. (45) Date of Patent: Aug. 4, 2026

(54) NETWORK AUTHENTICATION EVALUATION

(71) Applicant: Microsoft Technology Licensing, LLC, Redmond, WA (US)

(72) Inventors: Yanbang Wang, Ithaca, NY (US); Karl Hallgren, London (GB); Jonathan Larson, Bremerton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/439,475

(22) Filed: Feb. 12, 2024

(65) Prior Publication Data

US 2025/0337760 A1 Oct. 30, 2025

(51) Int. Cl.
*H04L 9/40* (2022.01)
*H04L 9/32* (2006.01)

(52) U.S. Cl.
CPC ........ *H04L 63/1425* (2013.01); *H04L 9/3297* (2013.01)

(58) Field of Classification Search
CPC .......................... H04L 63/1425; H04L 9/3297
See application file for complete search history.

(56) References Cited

U.S. PATENT DOCUMENTS 11,411,966 B2 * 8/2022 Muddu ............... G06F 16/9024
2022/0375198 A1 * 11/2022 Akagi ................. G06V 10/751

OTHER PUBLICATIONS

Radford, et al., "Improving Language Understanding by Generative Pre-Training," available at https://cdn.openai.com/research-covers/language-unsupervised/language_understanding_paper.pdf, Jun. 11, 2018, 12 pages.
Cruz, et al., "DeviceLogonEvents", Retrieved from: https://learn.microsoft.com/en-us/microsoft-365/security/defender/advanced-hunting-devicelogonevents-table?view=o365-worldwide, Mar. 8, 2023, 06 Pages.
Passino, et al., "Graph link prediction in computer networks using Poisson matrix factorisation", In Repository of arXiv:2001.09456v1, Jan. 26, 2020, pp. 1-21.

* cited by examiner

*Primary Examiner* — Jeffrey C Pwu
*Assistant Examiner* — Thong P Truong
(74) *Attorney, Agent, or Firm* — Rainier Patents, P.S.

(57) ABSTRACT

This patent relates to determining whether network authentication events are legitimate or malicious. One example includes receiving network data relating to past timestamped authentication events between network users and network devices and extracting graphical features from the timestamped authentication events. The example also includes extracting temporal features from the timestamped authentication events and training a temporal graph authentication anomaly detection model with both the extracted graphical features and the extracted temporal features.

16 Claims, 11 Drawing Sheets

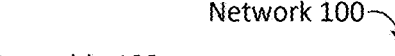
Network 100
Temporal graph 110
Datatable 108
| User 102 | Machine 104 | Time |
|----------|-------------|------|
| U3 | M1 | 1 |
| U2 | M3 | 1 |
| U1 | M1 | 2 |
| U1 | M1 | 3 |
| U2 | M1 | 3 |
| U2 | M3 | 3 |
| U2 | M3 | 4 |
| U3 | M1 | 5 |
| ... | ... | ... |
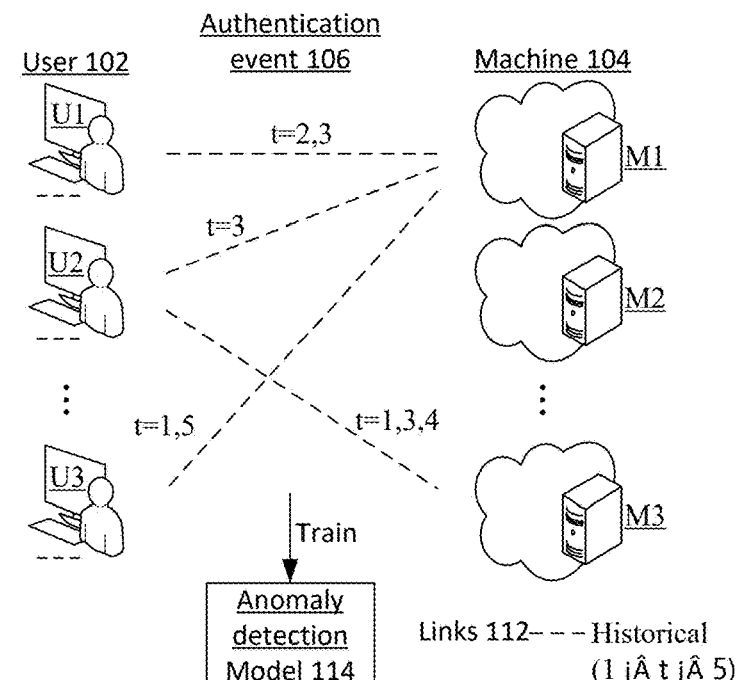
Instance One
Network 100
Temporal graph 110
Datatable 108
| User 102 | Machine 104 | Time |
|----------|-------------|------|
| U3 | M1 | 1 |
| U2 | M3 | 1 |
| U1 | M1 | 2 |
| U1 | M1 | 3 |
| U2 | M1 | 3 |
| U2 | M3 | 3 |
| U2 | M3 | 4 |
| U3 | M1 | 5 |
| U3 | M1 | 6 |
| ... | ... | ... |
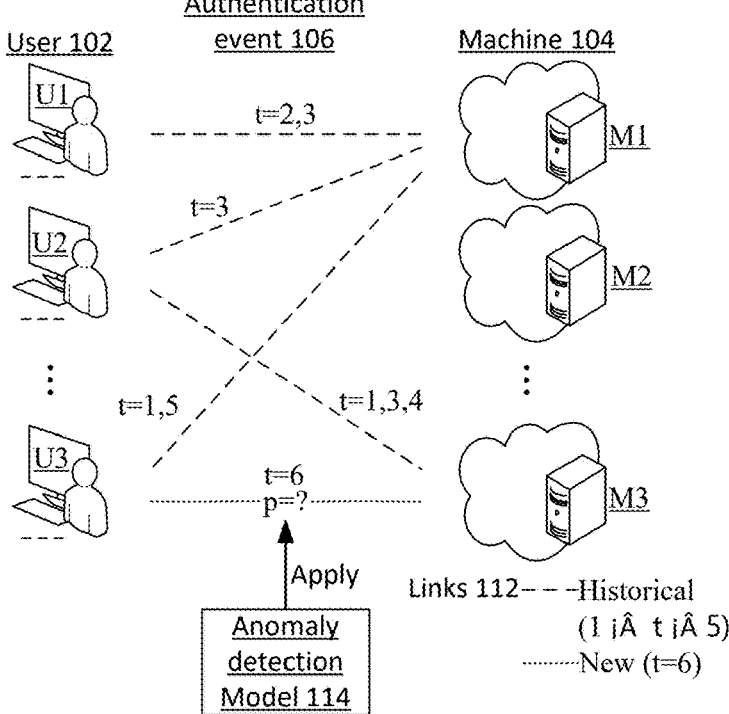
FIG. 1
Instance Two Plot 302
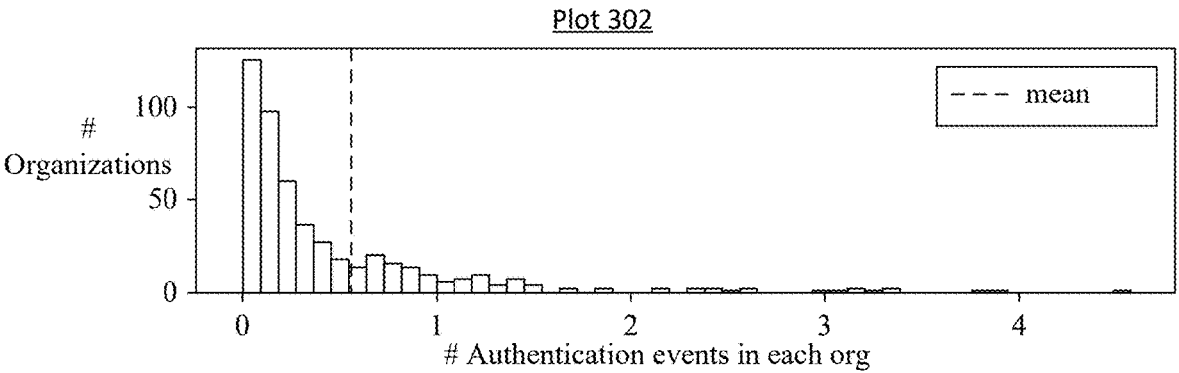
Plot 304
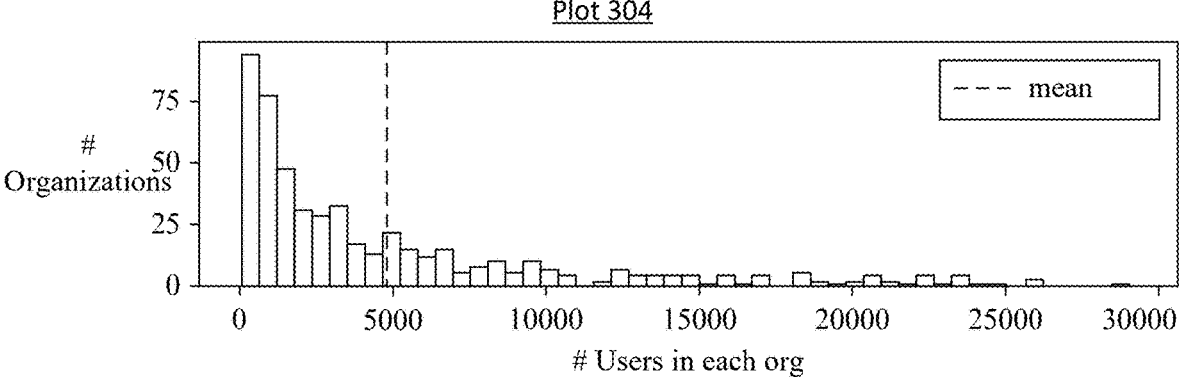
Plot 306
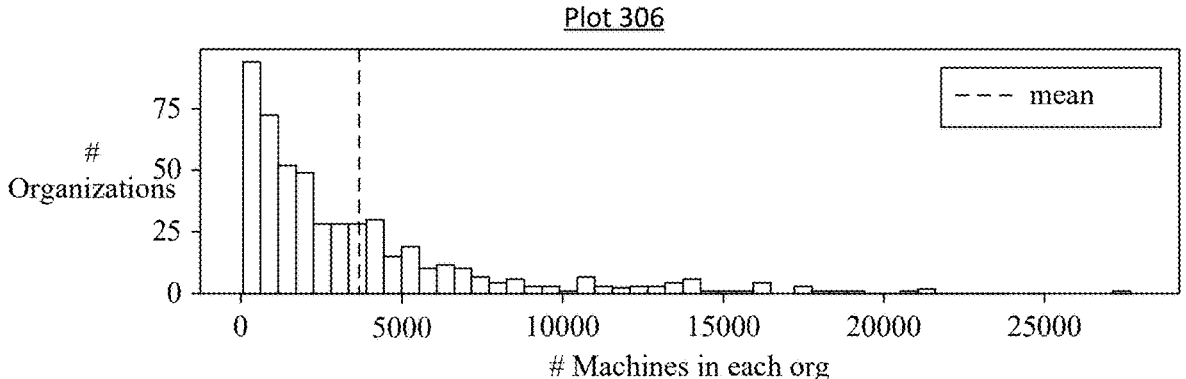
FIG. 3

Graph 500

Clusters
o Machine Cluster 1
• Machine Cluster 2
▫ Machine Cluster 3
▪ User Cluster 4
× User Cluster 5
+ User Cluster 6
△ User Cluster 7
▲ User Cluster 8

Scheme 600

Plot 702
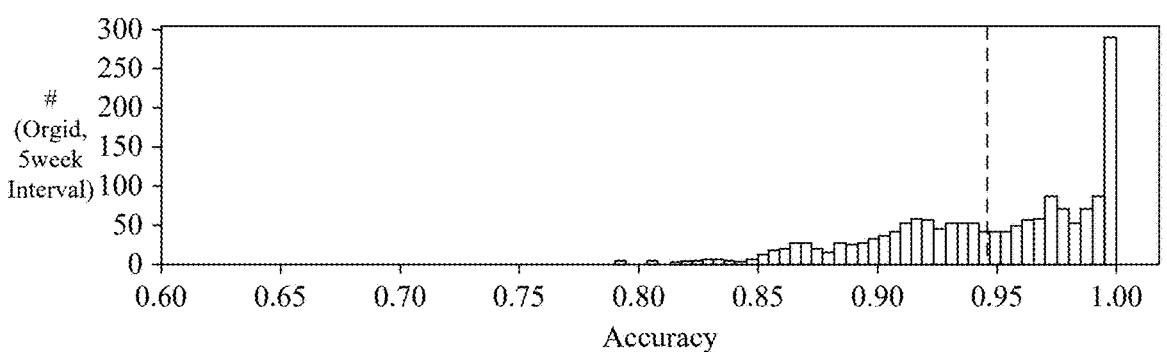
Plot 704
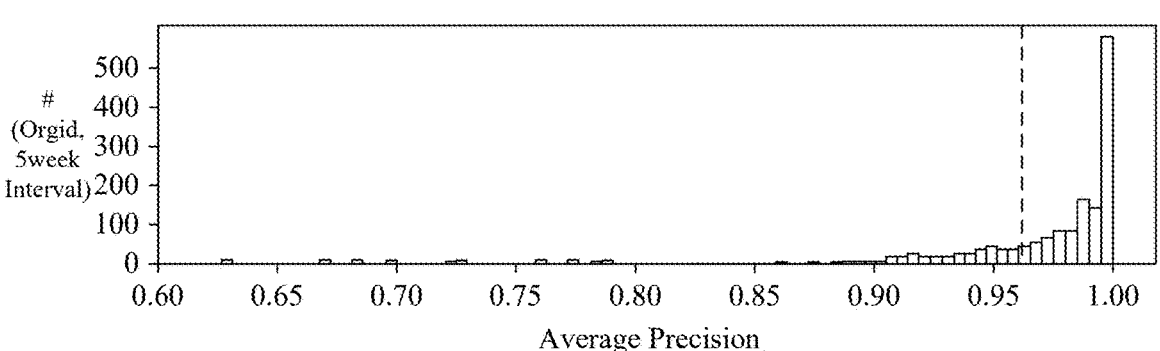
Plot 706
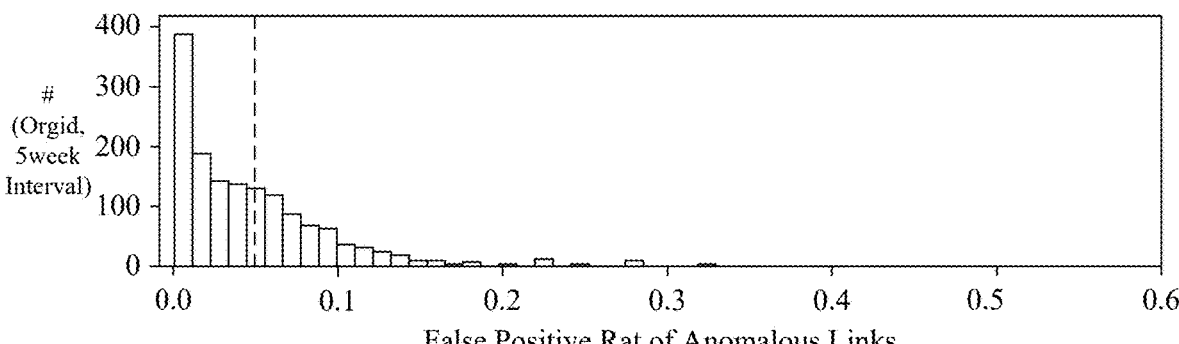
FIG. 7

Plot 802
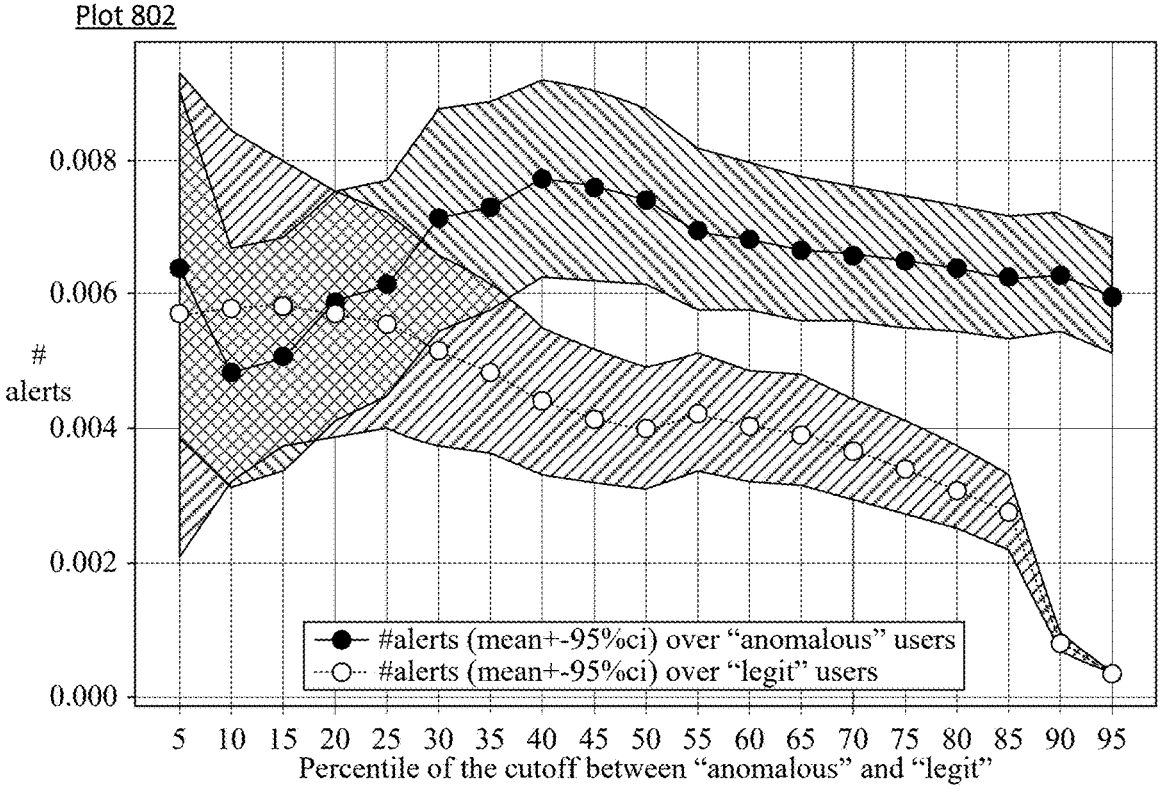
Plot 804
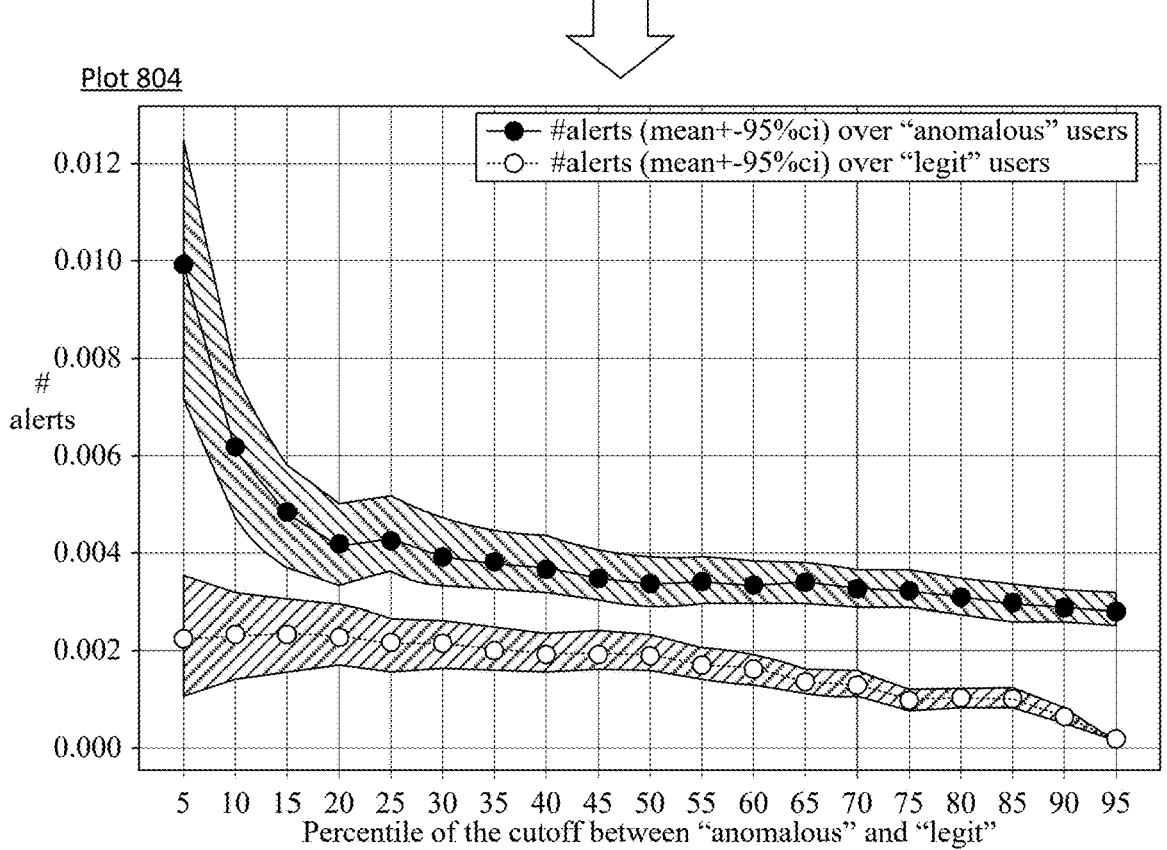
FIG. 8

Method 900

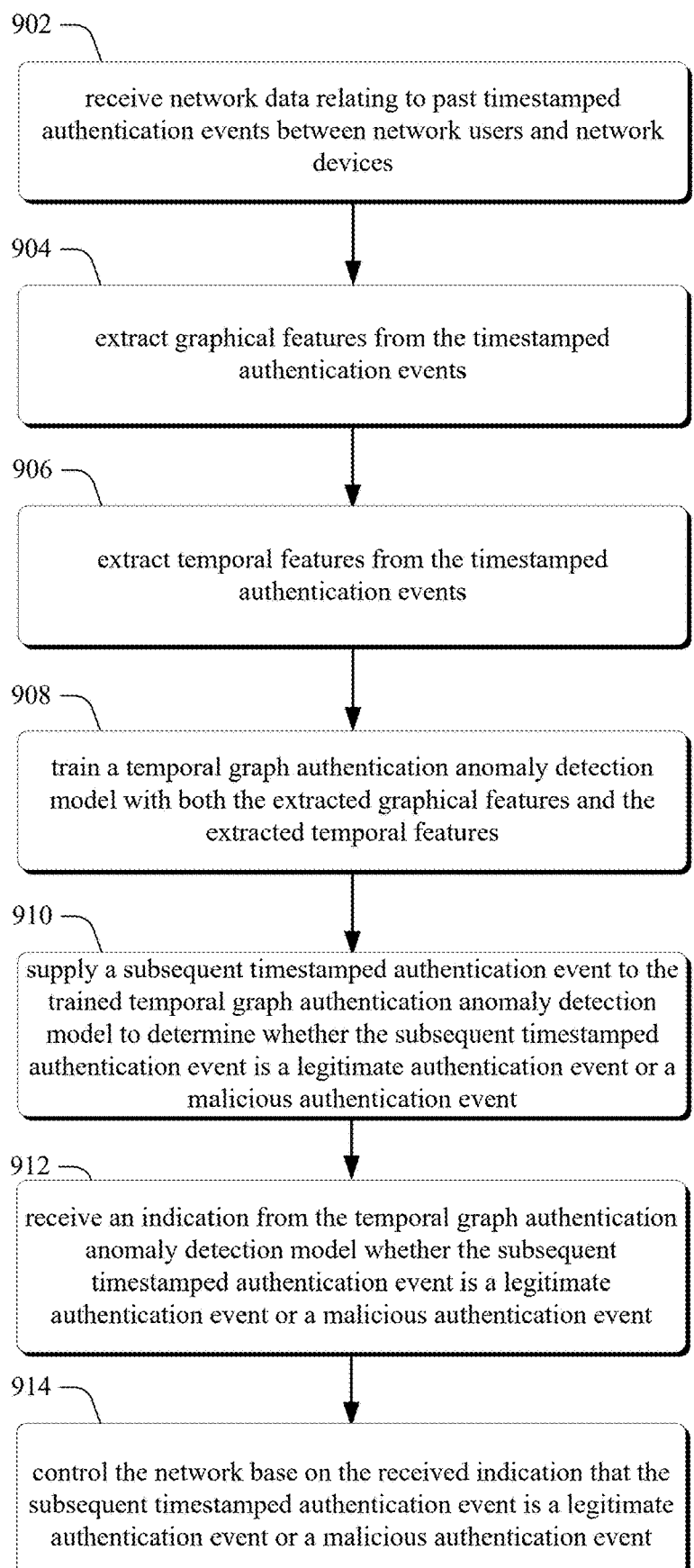

902 — receive network data relating to past timestamped authentication events between network users and network devices

904 — extract graphical features from the timestamped authentication events

906 — extract temporal features from the timestamped authentication events

908 — train a temporal graph authentication anomaly detection model with both the extracted graphical features and the extracted temporal features

910 — supply a subsequent timestamped authentication event to the trained temporal graph authentication anomaly detection model to determine whether the subsequent timestamped authentication event is a legitimate authentication event or a malicious authentication event

912 — receive an indication from the temporal graph authentication anomaly detection model whether the subsequent timestamped authentication event is a legitimate authentication event or a malicious authentication event

914 — control the network base on the received indication that the subsequent timestamped authentication event is a legitimate authentication event or a malicious authentication event

FIG. 9

NETWORK AUTHENTICATION EVALUATION

BACKGROUND

Cybersecurity is an important aspect of the modern world. In 2022, the FBI reported in its Internet Crime Report about receiving more than 800,000 cybercrime-related complaints, totaling a reported loss of over 10 billion USD, a 35% increase from the previous year. The alarming statistics make it imperative for entities worldwide to deploy security systems to protect their own networks. These security systems have also become a vital force in this modern-era battle against cybercrimes.

Intrusion detection is a critical component in security systems. Intrusion detection serves to monitor network traffic for signs of malicious activity and raise alerts for further investigation when such a sign is detected.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 1 illustrates an example scenario relating to authentication events and anomaly detection concepts consistent with some implementations of the present concepts.

FIGS. 3-5, 7, and 8 illustrate example graphs or plots that are consistent with some implementations of the present concepts.

FIG. 9 illustrates an example flowchart that is consistent with some implementations of the present concepts.

DETAILED DESCRIPTION

Overview

Figure 2:
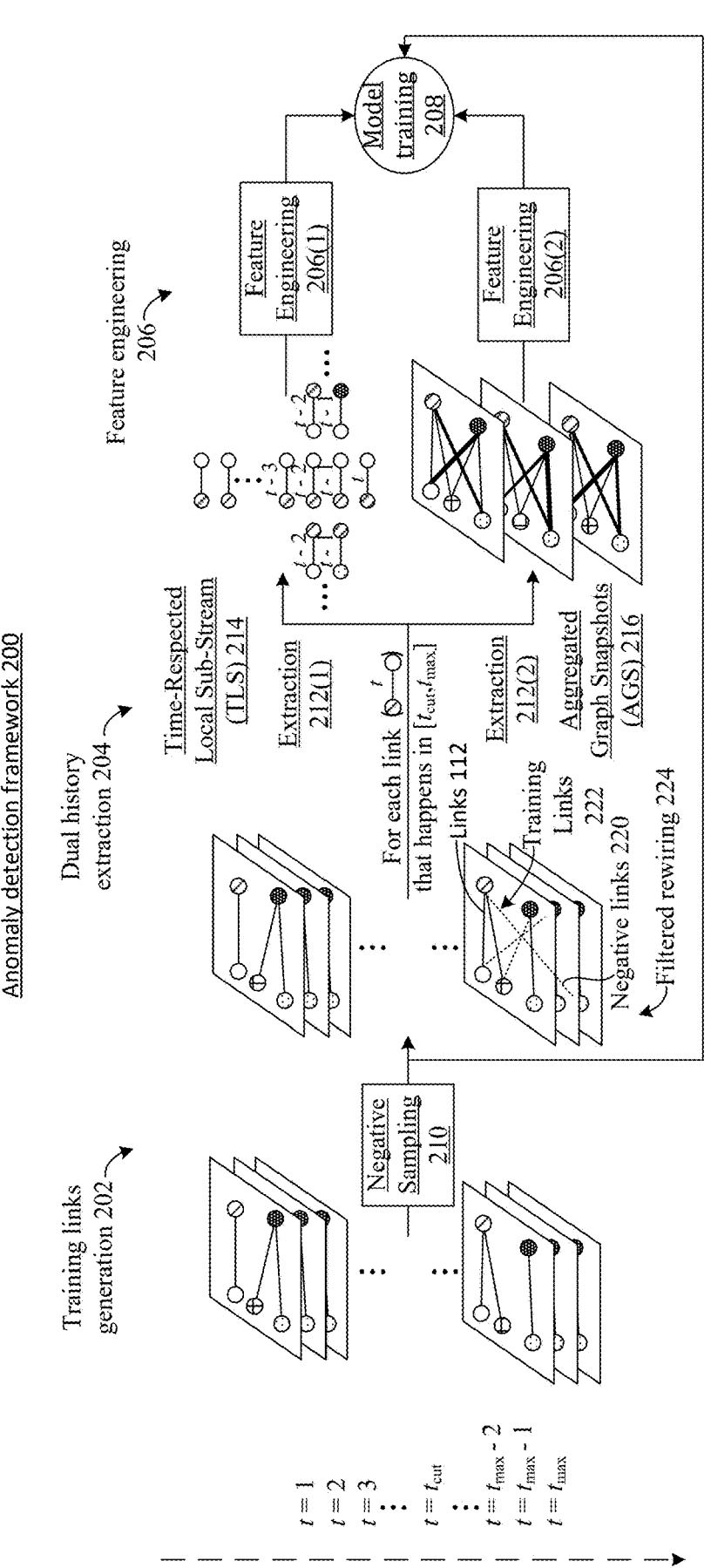
FIG. 2 shows an example anomaly detection framework that is consistent with some implementations of the present concepts.

Cybersecurity is an important and growing facet of protecting data from malicious actors. In 2022, the FBI reported in its Internet Crime Report about receiving more than 800,000 cybercrime-related complaints, totaling a reported loss of over 10 billion USD, a 35% increase from the previous year. The alarming statistics make it imperative for entities worldwide to deploy security systems to protect their own networks. These security systems have also become a vital force in this modern-era battle against cybercrimes.

Intrusion detection is a critical component in security systems. Intrusion detection serves to monitor network traffic for signs of malicious activity and raise alerts for further investigation when such a sign is detected. There are two types of intrusion detection in general: signature-based detection and anomaly-based detection.

Signature-based detection operates by "memorizing and matching." It stores a list of identifiers for all the known threats, such as their IP addresses, ports, and (hard-coded) patterns of network traffic. When working, it scans for a match between its stored identifiers and on-going network traffic. Signature-based detection excels at detecting known threats, because every match will almost surely unveil a true threat, which enables it to have a very low false positive rate. However, it cannot detect unknown threats, which have become very common as attacking methods quickly evolve.

To complement this shortcoming of signature-based detection, anomaly-based detection is introduced. Anomaly-based detection leverages the fact that, even though an intruder may succeed in disguising its own identity (signature), they may inevitably exhibit certain behaviors that significantly deviate from those of other (legitimate) network entities. This happens not because of the careless act of the attacker, but because of their lack of a holistic view of the structure and dynamics of the whole network system, the majority of which has not been comprised yet. Anomaly-based detection therefore is a very powerful tool that can handle both known and unknown threats, by leveraging machine learning and algorithms built upon nuanced understandings of the "normalcy" of network behaviors. A plethora of research in this area has occurred in recent years.

Despite the abundance of existing research, a persisting challenge in anomaly-based detection is its relatively high false positive rate, compared to signature-based detection. This is not too surprising though because it is hard for a machine learning model to predict things as precisely as memorizing and matching. The consequence of this gap, however, is that when anomaly-based detection is in use, more false alerts would be raised to the attention of end users and/or to security experts for further investigation. Either way, false alerts can lead to a huge waste of human resources as well as deterioration in user experience. Despite its significance, this problem remains under-explored in the literature.

The present concepts relate to the cause and solution of this technical problem by focusing on the task of detecting anomalous authentication events. Introductory FIG. 1 illustrates the present concepts applied to an example network 100. The network 100 includes users (administrators, clients, etc.) 102 and machines/devices (e.g., workstations, printers, servers, etc.) 104. An authentication event 106 is a network connection that happens at a specific time between an individual user 102 and an individual machine/device 104. The authentication events 106 are shown in a tabular data format (e.g., data table) 108 and on a temporal graph 110. On the data table 108 authentication events 106 are represented by rows that indicate the user, the device, and a time component. On the temporal graph 110 the authentication events 106 are represented as edges/links 112 between users and machines with a corresponding time component. (To avoid clutter on the drawing page, edges/links 112 are indicated generally on the drawing page rather than specifically designating every instance). In this example, the time components are relative timestamps (e.g., which relative order the authentication events occurred). In this document, the terms "authentication" and "logon" are used interchangeably. Similarly "edge" and "link" are also used interchangeably. Thus, an edge/link graphically represents an authentication event between individual users and devices.

Instance One shows a temporal series of observed historical authentication events 106 (e.g., authentication events that have already happened). Instance Two shows a new authentication event 106 with a dotted line at the bottom of the temporal graph 110.

A goal of anomaly-based detection is to determine whether new authentication events 106 are legitimate authentication events or malicious authentication events. Traditional anomaly-based detection techniques are inaccurate and produce a high rate of false alerts, or, equivalently, false negatives in the link prediction task. The present concepts offer anomaly-based detection techniques that are more accurate than traditional anomaly-based detection techniques. Toward this goal, the present concepts provide a technical solution that trains an anomaly detection model 114 using both temporal and edge related aspects of the historical authentication events 106. The trained anomaly detection model 114 receives the new authentication event 106 and evaluates temporal and edge related aspects of the new authentication event 106 to accurately evaluate whether the new authentication event 106 is a legitimate authentication event or a malicious authentication event.

This authentication evaluation task can be viewed as a link prediction task on the temporal graph 110. Thus, anomaly detection model 114 can be viewed as performing link prediction on the temporal graph 110. Performance of the anomaly detection model is dependent upon two technical issues. The first technical issue relates to label generation. Typical historical authentication events from a network lack negative (e.g., malicious) links. Training an anomaly detection model utilizes both positive (e.g., legitimate) links and negative (e.g., malicious) links. The standard protocol used by most traditional methods for constructing negative links, however, is sub-optimal in its design, which leads to insufficient exposure of the model to variations in temporal behaviors of network entities, i.e., nodes.

The second issue is that every existing model is based on a single form of data representation to encode dynamic history, either a stream or a graph snapshot. Single data representation helps simplify mathematical analysis for research purposes. However, studies show that in practice single data representation is insufficient for capturing the highly heterogeneous behaviors of different users or machines in the complex network. This results in misclassifying a legitimate but differently-behaved authentication event into an anomalous event.

The present concepts provide technical solutions to the problem of detecting anomalous events in a stream of authentication events. The problem is formulated as a link prediction problem on a bipartite temporal graph G=(V, E), such as temporal graph 110 of FIG. 1, constructed on authentication events in a system log or data table. The node set V=U∪M is the union of the set of users U (e.g., administrators, clients, etc.) and the set of machines M (e.g., servers, printers, etc.) in a network. Denoted by T= $\{1,2, \ldots t_{max}\}$ the total time range to consider, each link e∈E is a three-tuple (u, m, t) where u∈U, m∈M, t∈T. In other words, E ⊂ U×M×T.

The anomaly detection model 114 provides a link prediction functionality. The link prediction functionality can be viewed as a binary classifier: given the observation of G up to current time $t_{cur}$, the binary classifier outputs the probability p∈[0,1] for a newly observed link e=(u, m, t) at a future time t∈($t_{cur}$, $t_{max}$].

Such a binary classifier for link prediction can work as an anomaly detector because it learns the "normalcy" of the dynamics of authentication events through self-regressing on links 112 of the dynamic network. Therefore, if the link predictor assigns a low probability to a link, it means that the behavior of that link deviates from the normalcy, indicating it to be an anomalous authentication event.

There is a slight term abuse to clarify, regarding the meaning of "positive" and "negative" in different contexts. In the context of link prediction as a learning problem, a positive link is a link that exists, and a negative link is a link that should not exist (but gets created for the sake of training a binary classifier). In the context of security alert systems, the opposite is true: a detected negative link triggers a positive alert. Therefore, the aim of reducing false positive alerts corresponds to the problem of reducing false negatives in the link prediction problem formulated above.

FIG. 2 shows an example novel anomaly detection framework 200. This example anomaly detection framework 200 includes training links generation 202, dual history extraction 204, feature engineering 206, and model training 208. Anomaly detection framework 200 can further include negative sampling 210, time-respected local sub-streams 214, and/or aggregated graph snapshots 216.

Anomaly detection framework 200 provides a technical solution to the two problems noted above based on the unification of the two most popular views of temporal graphs: graph snapshots and link streams. Unifying graph snapshots and link streams allows the technical solution to strive for the best coverage of behavioral heterogeneity.

Anomaly detection model training is accomplished with (positive) links 112 and negative links 220, which together are referred to as training links 222. To generate high-quality anomaly detection model training instances, the present concepts employ a carefully designed negative sampling 210 procedure called filtered rewiring 224. The filtered rewiring 224 ensures that negative links 220 being generated are both truly negative and instructive. Extensive evaluation of example implementations was performed on four months of authentication data collected from 125 randomly selected real-world entities' networks. The numerical results well substantiate the effectiveness of the present concepts.

Anomaly detection framework 200 enables training the anomaly detection model 114. The input is a dynamically-evolving bipartite graph in which each link (u, m) represents an authentication event between user u and machine m. As introduced above, the anomaly detection framework 200 includes multiple steps including negative sampling 210. Training links generation 202 involves generation of training links 222 that include negative links 220. Negative sampling 210 generates training negative links 220 and their labels ($y_{train}$) from time interval [$t_{cur}$, $t_{max}$]. This process can involve filtered rewiring 224.

The anomaly detection framework 200 includes dual history extraction 204 that is performed for training links 222 including generated negative training links 220. Dual views are constructed for the training links 222 of their relevant history for feature extraction 212. The stream-based view extracts the time-respected local sub-streams 214 for each training link 222. The aggregated graph-snapshot-based view extracts the aggregated graph snapshots 216, which are shared between all training links 222.

Feature engineering 206 is performed for training links 222 to engineer features ($X_{train}$) of the two views from the dual history extraction 204. Anomaly detection model training 208 trains a binary classifier on $X_{train}$ and $Y_{train}$ generated in the previous steps. These aspects provide a technical solution that helps reduce false positive alerts among other advantages.

Individual aspects of anomaly detection framework 200 are described in more detail below.

Training links generation 202 generates training links 222 from the input temporal graph. The training links 222 consist of (positive) links 112 and negative links 220. This process can be crucial in any network-based anomaly detection framework because any defects will be carried through to the trained anomaly detection model, irrespective of the model architectures or features applied in subsequent steps.

The existing standard protocol for negative sampling is to treat all existing links in the input as positive. The negative links are then generated by sampling random nodes u' and m' for each positive link (u, m, t) and treating (u', m, t) and (u, m', t) as the desired negative links. This protocol has been widely adopted by a long line of existing technologies, including state-of-the-art anomaly detection methods, and state-of-the-art dynamic link prediction methods.

In practice, however, this existing protocol has become a bottleneck for reducing false positive alerts, for at least two reasons. First, there is no truth checking to ensure that the sampled links are truly negative. Mislabeling a positive link as negative will mislead the model into making unnecessarily harsh judgement on links that should exist, resulting in more false negatives in its link prediction's output, or equivalently more false positive alerts.

Second, the default protocol overlooks the importance of temporal information: the protocol should also consider (u, m, t') as a valid category of negative links, where t' is sampled from a certain distribution $\mathcal{D}_t$. The consequence of not doing so is that the link predictor (e.g., prediction model) becomes insufficiently exposed to temporal patterns of its prediction target, making a higher number of both false positive and false negative errors.

Designing a good strategy to negative-sample t' is non-trivial. In particular, the selection of $\mathcal{D}_t$ can be tricky, as the authentication events in the real data exhibit very strong periodicity. This means that if the process arbitrarily designates a $\mathcal{D}_t$ (e.g., the full range of $(t_{cut}, t_{max}]$) the process may inadvertently assign negative labels to links that should have existed according to the periodic patterns, akin to the first case above.

Based on the analysis above, the present concepts include a new protocol for generating training instances, which is consistent with FIG. 2 and is presented in Algorithm 1.

---

Algorithm 1 Generating Training Instances by Negative Sampling

```
Require: history links E_h, newly observed links E_t
 1:   E⁺ ← Ø, E⁻ ← Ø
 2:   U ← {ul(u, m, t) ∈ E_h}, M ← {ml(u, m, t) ∈ E_h}
 3:   T ← {tl (u, m, t) E E_t} H ← Ø
 4:   for (u, m, t) ∈ E_t do
 5:       Uniformly sample a case number from {1,2,3}
 6:       if case = 1 then
 7:           Repeatedly do: u' ~ U, until finding a (u', m, t) ∉ E_h
 8:           E⁺ ← E⁺ U {(u, m, t)}, E⁻ ← E⁻ U {(u', m, t)}
 9:       else if case = 2 then
10:           Repeatedly do m' ~ M until finding a (u, m', t) ∉ E_h
11:           E⁺ ← E⁺ U {(u, m, t)}, E⁻ ← E⁻ U {(u, m', t)}
12:       else
13:           t' ~ T
14:           if (u, m) ∈ H then
15:               E⁺ ← E⁺ ∪ {(u, m, t)}
16:           else
17:               c ← 1
18:               while (u, m, t') ∈ T or (t − t') mod (24hrs) ∈
                   [0,2hrs] ∪ [22hrs, 24hrs] do
19:                   t'~ T, c ← c + 1
20:                   if c > 5 then
21:                       H ← H ∪ {(u, m)}, then break the loop
22:                   end if
23:               end while
```

6

-continued

Algorithm 1 Generating Training Instances by Negative Sampling

```
24:               E⁺ ← E⁺ ∪ {(u, m, t)}, E⁻ ← E⁻ ∪ {(u, m, t')}
25:           end if
26:       end if
27:   end for
28:   return E⁺, E⁻
```

The input is two sets of temporal links, history links $E_h$ and newly observed links $E_r$. For each newly observed link, one of the three cases is randomly executed for link rewiring. In the first two cases, one of the observed link's end nodes is rewired, u or m, to a randomly sampled new node, after truth checking.

In the third case, "temporal rewiring" keeps both end nodes and rewires the link by giving it a randomly sampled new timestamp. The process also carefully handles the scenario where the new link (u, m, t') does not qualify as a valid negative link. This scenario occurs quite often in practice, which indicates that there often exist some user-machine pairs in the network system that communicate on a highly frequent or highly regular basis. Thus, filtered rewiring generates fake or negative links for training purposes. Individual fake links are derived from an existing positive link by changing either the user, the machine, or the date/time.

Lines 18-23 of Algorithm 1 combine truth checking with search for regular patterns of user-machine connections. This code segment is essentially saying that the process rejects the negative sample if its timestamp falls into a±2 hours interval of the original timestamp at the same time of the day. Also, a user-machine (u, m) pair is blacklisted if its samples are rejected five times in a row (line 21), because the same (u, m) pairs may appear many times in $E_r$. Also notice that other alternatives for this pattern matching condition are also possible.

In some implementations minimal assumptions are made about the information (attributes) that can be carried by each target link itself. Thus, successful prediction relies on full exploitation of any historical dynamics that are relevant to the prediction. Therefore, this step focuses on extracting and structuring the relevant history of each target link. This also encapsulates the technical solution of decoupling the extraction and encoding of dynamic history. The extraction part focuses on defining what historical links are most relevant for predicting the label of the current link, and how to organize them into data structures that are most helpful for the encoding. The encoding part includes engineering numerical features (constructing attributes, learning embeddings, etc.) out of the extracted history.

For each link e=(u, m, t) with t∈ $[t_{cut}, t_{max}]$, the process considers its Aggregated Graph Snapshots (AGS) 216 representation of dynamic history as a sequence of K static graphs that evenly slice the whole time range [1, $t_{cut}$] of dynamic history into K time intervals. Formally, the AGS view is defined as $\{G_i\}$, i=0, . . . , K−1, where $G_i$ aggregates all links that happened within $[t_i, t_{i+1}]$, and $$G_i = (V, E_i), E_i = \{(u, m, t) \mid t_i \le t < t_{i+1}, (u, m, t) \in E\} \quad (1)$$

$$t_0 = 1, t_K = t_{cut}, t_1 - t_0 = t_2 - t_1 = \ldots = t_K - t_{K-1} \quad (2)$$

Note that $t_{cut}$ essentially controls the horizon of relevant history to be considered (as all t's here are re-indexed and discretized timestamps), and the granularity of the dynamics is decided by $$\frac{t_{cut}}{K}.$$

The present concepts include time-respected local stream (TLS) 214 as an enhanced stream-based data representation of dynamic history. TLS generalizes and unifies the data representations used in many edge-stream-based link prediction methods.

For each link e=(u, m, t) with t∈ [$t_{cut}$, $t_{max}$], its l-order time-respected local substream $E_{um}$ is a union of the sets of historical links that are most relevant to u and m, i.e., links that happen before t between u and m, and links on the time-respected walks of length l on the dynamic network starting from either node u or node m. Mathematically, $$E_{um} = \bigcup_{i=0,1,\ldots,l} E_{um}^{(i)}$$

$$E_{um}^{(0)} = \{(u, m, t) \mid t_i \le t < t_{i+1}, (u, m, t) \in E\}$$

$$E_{um}^{(i)} = \{w[i], w \mid w \in W_{um}\}, \text{ for } i \in 1, \ldots l$$

$$W_{um} = \{\{(n_{i-1}, n_i, t_i)\}_{i=1,\ldots l} \mid n_0 \in \{u, m\},$$

$$t \ge t_1 \ge \ldots \ge t_l, (n_{i-1}, n_i, t_i) \in E\}$$

In the formulation above, $W_{um}$ represents the set of all time-respected walks whose start node is either u or m. A walk is a sequence of vertices and edges of a graph. In practice, |$W_{um}$| would grow exponentially fast as l the order number or $t_{cut}$ the history horizon goes large. A workaround is to downsample the time-respected walks, turning them into time-respected random walks and biasing towards more recently occurring links. The present concepts formulate this recentness bias to be exponentially decayed along time. Formally speaking, say the current random walk reaches node n at time t and is about to take a new step to select the next historical link, then it selects this next link by drawing from the distribution $$P((n, n', t_x)) \propto e^{\alpha(t-t_x)}, \text{ for all } (n, n', t_x) \in E \text{ and with } t_x < t. \quad (3)$$

For each target link, the process samples a total of M time-respected random walks where M is a hyperparameter.

The description now turns to feature engineering 206. In this step, the process converts the extracted dynamic history into numerical features, producing $X_{train}$ for the model training step. In general, the features produced at this step can either come from system audit or from the construction based on the spatio-temporal structures of the extracted history. However, system audit features can be highly platform-dependent, so it is hard to make general assumptions of their availability. Therefore, some of the present implementations focus on presenting the spatio-temporal features. The subsequent experimental results are also based on using the spatio-temporal features only.

The description now turns to features based on AGS 216. For each target link (u, m, t), the process constructs the following features: basic graph statistics. These include node degrees, clustering coefficient, and Katz centrality of u and m in each graph snapshot.

The most popular type of spectral embeddings is based on eigen-decomposing the graph Laplacian matrix. Some implementations show that a variant of spectral embeddings that is based on eigen-decomposing the graph adjacency matrix can be especially useful when the graph exhibits strong clustered structures. Therefore, the process computes both types of spectral embeddings for u and m in each graph snapshot.

The next feature is personalized page rank (PPR). PPR is another well-tested method for quantifying the closeness of two nodes in a graph. PPR can be viewed as the probability for a random walk in the graph starting from one node to reach the other node (with a fixed restart probability in each step). Because PPR is not commutative, i.e., PPR (u, m)≠PPR (m, u), the process computes both values in all graph snapshots.

The next feature is meta-paths. The idea of meta-paths has been adopted into powerful features to characterize structural patterns and closeness of nodes in heterogeneous networks. In the present problem, each graph snapshot is a bipartite graph, which allows the process to record the network schemas for all possible meta-paths of up to a certain length l and count their occurrences in the graph snapshots.

The description now turns to features based on TLS 214. For each target link (u, m, t), the process constructs the following features: features based on the timestamp of the target link: time-of-the-day (e.g., 1:00 A.M., 2:00 A.M. etc.), day-of-the-week (e.g., Monday, Tuesday, etc.). Features based on $$E_{um}^{(0)}:$$

time gap between the most recent link and the target link, number of links that happen on weekdays, weekends, and their ratio. Features based on $$E_{um}^{(i)} (i \ge 1):$$

number of links associated with u and m, respectively, that happen on weekdays, weekends, and their ratio; number of shared common neighbors shared by m and u in $$E_{um}^{(1)}.$$

The process utilizes K-nearest-neighbor features. Using all the above features for target links, the process further constructs a weighted K-nearest-neighbor (KNN) graph. Each node in this KNN graph represents a target link. Each node connects to K other nodes whose extracted features are most similar to its own feature, measured by Euclidean distance. The weight of each edge in the KNN graph is the reciprocal of the Euclidean distance. Finally, for each node (target link), the process computes its node degree, defined as the sum of the weights of all edges incident to the node. The process treats this "node degree" as a feature of the target link. Note that a smaller value of this feature means that the target link is very different from the rest of the other target links.

The features engineered above are by no means exhaustive. One of the key designs to emphasize here, however, is the idea of designing features based on different data representations, which helps transform feature engineering into a more systematic and organized process.

The description now turns to model training 208. The process concatenates all the features generated in the previous step into $X_{train}$. With $X_{train}$ and $y_{train}$, the process uses XGBoost to train a binary classifier. XGBoost is a tree-based ensemble algorithm that has achieved tremendous success in many machine learning applications over the past decade. It is highly expressive, interpretable, and resilient to overfitting.

To summarize, the high false positive (FP) rate of authentication alerts remains a prominent challenge in cybersecurity. The present concepts identify two technical problems that cause the high false positive issue, which are unaddressed in existing learning-based anomaly detection methods. First, in industrial applications, ground-truth labels for malicious authentication events are extremely scarce. Therefore, learning-based methods should optimize their procedures for auto-generating high-quality training instances, an aspect that existing techniques have overlooked. Second, every existing model is based on a single form of data representation, either stream or graph snapshot, which may not be expressive enough to identify heterogeneity in behaviors of networked entities. This results in misclassifying a legitimate but differently-behaved authentication event into an anomalous one.

The present concepts provide technical solutions that address these problems with anomaly detection framework 200 based on self-supervised link prediction on dynamic authentication networks, with two highlighted features. First, the anomaly detection framework 200 is based on the unification of the two most popular views of dynamic interconnected systems: graph snapshots and link streams, ensuring the better/best coverage of behavioral heterogeneity. Second, to generate high-quality training samples, the technical solution involves a carefully designed negative sampling procedure called filtered rewiring, to ensure that the negative samples used for training are both truly negative and instructive.

Existing techniques employ graph-based models to detect anomalous authentication events in various ways. Depending on the nature of the graph being constructed, they can be categorized into static-graph-based methods and temporal-graph-based methods. Static-graph-based methods translate authentication events into static edges in a graph, ignoring their inherent temporal information. These methods have the advantage of being lightweight to train and deploy, but they miss the crucial information of time and often fail to capture event dynamics.

Temporal-graph-based methods treat the authentication events as temporal edges in a constantly evolving graph, i.e., temporal graph. They gained popularity in recent years. For example, AddGraph proposes a learning framework that operates on a sequence of graph snapshots in a temporal graph. StrGNN extracts the h-hop enclosing temporal subgraph centered on the target edge and then uses a graph neural network to make predictions.

Anomaly detection is often formulated as a link prediction task. Therefore, many existing link prediction methods can also be seamlessly applied to anomaly detection. Existing methods for link prediction in temporal graphs can be categorized into two groups, depending on the data representation (view) that they employ to encode structural dynamics.

Methods that employ the "graph snapshots" view split a sequence of links by consecutive time windows, then aggregate links within each time window into a graph snapshot. Compared to "snapshot" methods, "stream"-based methods adopt a more fine-grained view that treats each link as an individual entity. Under this view, all graph manipulations such as message passing, feature retrieval, and embedding update, are conducted on the link level.

Table 1 further summarizes the usage of these two data representations, by surveying some influential methods for anomaly detection or link prediction methods proposed in the past five years. It is important to note that none of these methods use both graph snapshots and stream at the same time. Using a single data representation helps simplify mathematical analysis for research purposes. However, in practice this also leads to the insufficient coverage of structural dynamics, which hurts model performance.

TABLE 1

| Method | Snapshots? | Stream? | Venue & Year |
|---|---|---|---|
| AddGraph | Yes | No | IJCAI 2019 |
| NetWalk | Yes | No | KDD 2018 |
| StrGNN | Yes | No | CIKM 2021 |
| SedanSpot | No | Yes | ICDM 2018 |
| NerualTW | No | Yes | NeurIPS 2022 |
| CAWN | No | Yes | ICLR 2021 |
| TGAT | No | Yes | ICLR 2020 |
| VGRNN | Yes | No | NeurIPS 2019 |
| EvolveGCN | Yes | No | AAAI 2020 |

The description now turns to evaluation of some of the present implementations. Testing was performed on authentication data associated with Microsoft® Corp. This data was available to the inventors, but the present concepts are equally applicable in other network scenarios. In relation to testing, raw authentication data was used from the Microsoft 365 Defender® (M365d) DeviceLogonEvents tables, whose documentation can be found at https://learn.microsoft.com/en-us/microsoft-365/security/defender/advanced-hunting-devicelogonevents-table?view=o365-worldwide. Each DeviceLogonEvents table contains information about user logons and other authentication events on machines (e.g., workstations, printers, servers, etc.) within one organization. The organizations are businesses that subscribe to Microsoft brand services, and they are independent of each other. Data security and privacy were maintained throughout the testing and evaluation process.

Each row of the DeviceLogonEvents table corresponds to a logon event that happened between a specific user (AccountSid) and a specific machine (DeviceId) at a specific time (Timestamp). As mentioned above, the testing could be performed on other authentication data and the inventive concepts can be applied to other network data that is not associated with Microsoft Corp.

The original dataset contains M365d DeviceLogonEvents data for 500 randomly picked organizations, during the period between Mar. 26, 2023 and Aug. 9, 2023. A quarter of the device logon events were utilized for experiments. For preprocessing, only records with LogonType in ("NetworkCleartext", "Network", "RemoteInteractive", "CachedRemoteInteractive") and ActionType=='LogonSuccess' are retained. This means that the study is primarily interested in the successful remote logons as opposed to onsite logons or unsuccessful logons. The present concepts can be employed in various scenarios, including remote and onsite logon security.

The description now turns to a statistical overview. FIG. 3 shows plots 302, 304, and 306, respectively of the distributions of several basic statistics for the tested real-world organizations. The statistics include the number of logon/authentication events on plot 302, the number of users on plot 304, and the number of machines on plot 306, in each organization. In total, the dataset contains 2.5 million users, 2.0 million machines, and 2.8 billion logon events. Also notice that each organization has 5.6 million logon events on average in the studied 4-month period, and all three distributions are long-tailed. Next, the investigation focuses on a representative organization whose number of logon events, users and machines are all close to the average of the whole population.

Figure 4:
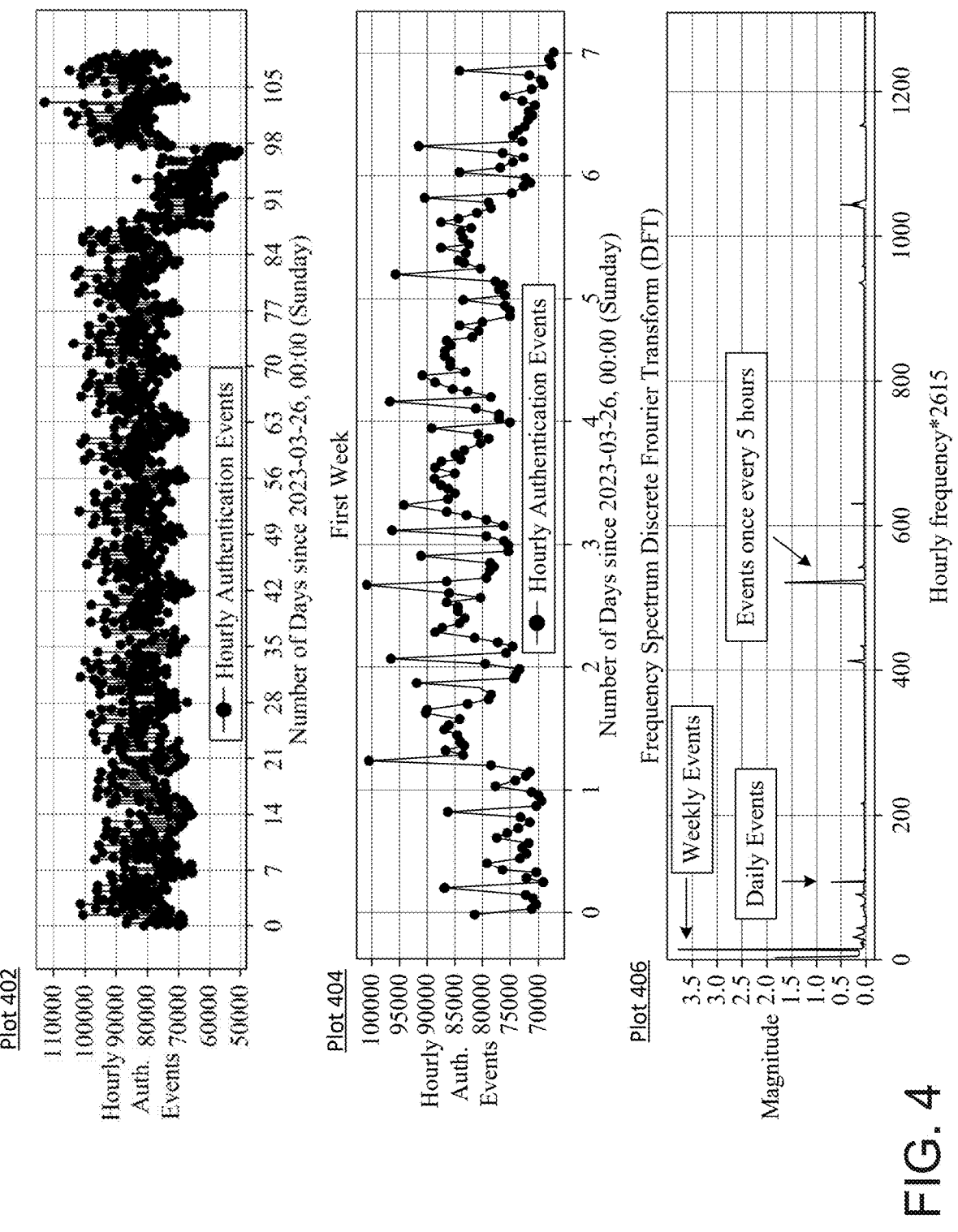

FIG. 4 shows logon events as a stream (time series). Frequency plot 402 visualizes the number of logon events per hour of the representative organization, starting from 00:00, Mar. 26, 2023. Plot 404 provides more details in the first week, and bottom plot 406 is (the first half of) the frequency spectrum after applying discrete Fourier transform to the time series (stream) signal in the first plot, which essentially visualizes the periodic patterns of the collective logon behaviors in the organization.

These time series plots 402, 404, and 406 contain rich information about the temporal regularity of the logon events, which turns out to be tremendously helpful for reducing false positives in anomaly detection. From the first two plots 402 and 404, strong periodic patterns of weekly and daily events are observed, as well as the impact of the Independence Day (Jul. 4, 2023). The frequency plot further shows a perhaps surprising component of frequency at once every 5 hours. Substantially fewer logon events occur on weekends than on weekdays. These observations can be leveraged to design features for a better model.

Figure 5:
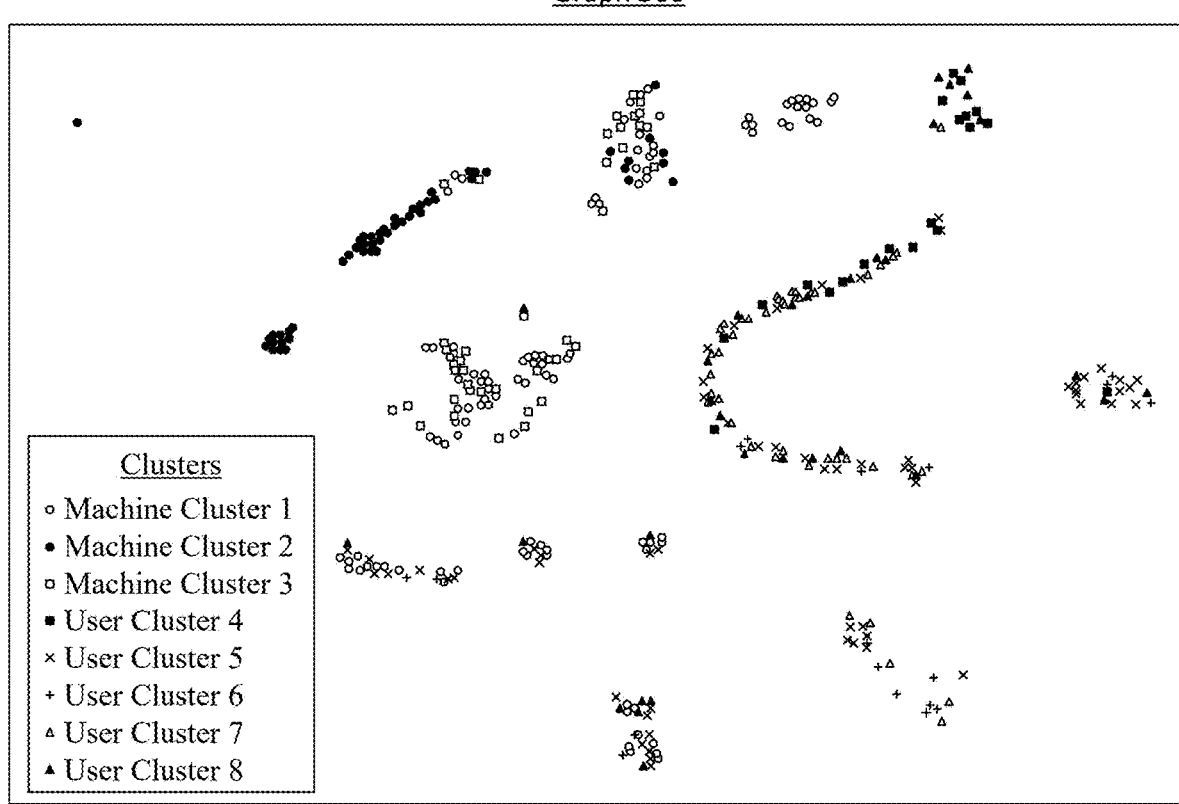

FIG. 5 shows a graph 500 of Laplacian embeddings that aggregate all logon events in a representative organization. Graph 500 aggregates and models the logon events and further visualizes using graph embeddings. This technique can be applied to the same representative organization used above by applying the following procedures. This includes collecting all logon events that happen within a three-week period, between Apr. 16, 2023 and May 6, 2023. The logon events are then mapped onto the graph 500, whose nodes are users and machines. An edge in this graph means that there is at least one logon event between the two end nodes (a user and a machine) within the three-week period. The Laplacian spectral node embeddings are computed and projected onto a plane using T-SNE. The technique then plots the projected embeddings of a uniformly sampled subset (about 15%). The node embeddings can be colored or otherwise indicated by their corresponding clusters, determined by running K-means on the cost comprehensive set of features.

Figure 6:
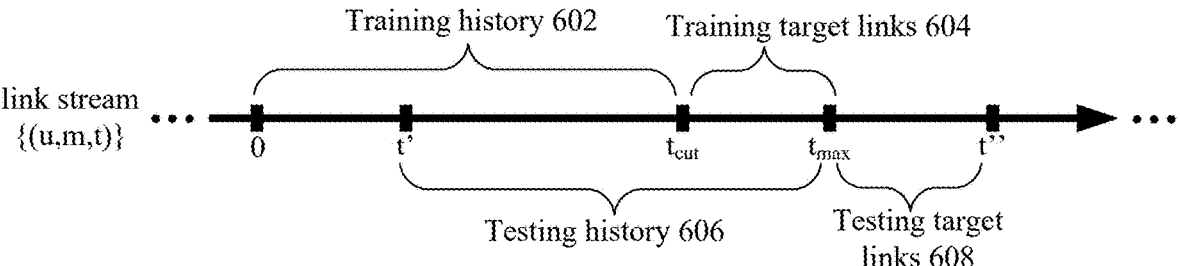
FIG. 6 shows an example anomaly detection scheme that is consistent with some implementations of the present concepts.

The description now turns to the example experimental setting, which is described relative to FIG. 6, which shows scheme 600. In order to generate the testing set or to deploy the anomaly detection model, the process can employ a slightly more complex data splitting scheme than the one described above. An example scheme is where $t_{max}$ is the "current time"; links within interval [0, $t_{max}$] are what the process has observed. Links within [$t_{max}$, t"] are links awaiting to be classified, whose ground truth labels are known in testing and unknown in actual deployment.

The interval for observed links is further split into [0, $t_{cut}$] and [$t_{cut}$, $t_{max}$], which correspond to training history 602 and training target links 604, respectively. [t', $t_{max}$] is the interval for testing history 606. In the evaluation, the process set $t_{cut}$–0=$t_{max}$–t'=3 weeks, and t"–$t_{max}$=$t_{max}$–$t_{cut}$=1 week. Also notice that the training target links 604 are disjoint from the testing target links 608. Therefore, testing labels are not leaked in training, even though testing history 602 has overlap with training target links 604.

Multiple rounds of training and testing were conducted on the full-time range of M365d DeviceLogonEvents data described above. For each organization, the first round starts by aligning t=0 in the splitting scheme with the actual timestamp of 00:00, Mar. 26, 2023. Each subsequent round shifts by one week ahead, resulting in 15 runs in total for the 4-month data of each organization. This example configuration experiments on 25% of the organizations in the database, so in total there were 15×500×25%=1875 rounds of experiments.

The present methods are compared with four previous state-of-the-art baselines: AddGraph, StrGNN, CAWN, and TGAT. The tests also relate to a modified version of the Multinomial-Dirichlet model, which is a lightweight, industry-standard model. All baselines use their own negative sampling protocol to generate training instances.

The process involves two types of evaluation: (1) the process measures the model's performance on the link prediction task, using metrics like accuracy (Acc), average precision (AP), and false positive alert rate (FP). This is the prevalent form of evaluation in literature because it does not require any ground-truth labels for anomalous links. (2) The process studies the correlation between model-predicted anomalous links with real Microsoft Defender® security alerts. Compared to (1), this evaluation is better aligned with the actual application of anomaly detection, but is limited in scope as it requires labels for verified anomalous links.

Table 2 shows the performance of the compared methods on the link prediction task, aggregated over all rounds of training and testing. FIG. 7 further shows the distributions of the performance in each round on graphs or plots 702, 704, and 706.

The present concepts and resulting implementations mark a significant improvement on all metrics, especially FP alert rate. This success is attributed to the improved negative sampling scheme and the combination of graph snapshots and stream-based data representations to encode dynamic history. As can be seen in Table 2, among the baselines, observation indicates the standard industry model compares favorably to some of the more recent baselines, though it still has relatively high false positive alert rate. CAWN achieves the best performance in baselines, consistent with a very recent benchmark study.

TABLE 2

| Method | FP | Acc | AP |
|---|---|---|---|
| StrGNN | 15.69 ± 3.20 | 76.52 ± 2.09 | 84.08 ± 2.07 |
| AddGraph | 18.10 ± 3.66 | 76.39 ± 3.47 | 78.66 ± 3.10 |
| CAWN | 6.11 ± 1.98 | 93.30 ± 1.12 | 94.62 ± 1.95 |
| TGAT | 9.36 ± 2.84 | 90.11 ± 2.08 | 92.71 ± 1.97 |
| Multi-Dirichlet (modified) | 15.05 ± 3.40 | 79.86 ± 3.02 | 85.59 ± 2.45 |
| Present method | 4.69 ± 1.01 | 94.52 ± 0.98 | 96.08 ± 0.99 |

The description now turns to evaluation via correlation analysis with real security alerts. Further analysis indicates how well the present anomaly detection model's prediction output aligns with the actual Microsoft Defender security alerts.

FIG. 8 shows a scheme for splitting the link stream for model training and testing (or deployment) as shown on plots 802 and 804. These plots show the average number (+/−95% confidence interval) of security alerts reported on each user in classified anomalous group and classified legitimate group. The x-axis is the different percentiles used to divide the users into two groups.

The following procedures are used to generate the results shown in FIG. 8. First, for each user in the organization, the process counts the number of links incident to them that are classified as anomalous by the anomaly detection model. Then, the process sorts all users by this number, from high to low. Finally, the process divides the sorted list of users into "anomalous users" and "legitimate users" by different percentiles. For each classified group, the process computes and plots the average number (±95% confidence interval) of security alerts reported on each user in the group. The security alerts have been reported by Microsoft Defender and filtered by domain experts, so they can be viewed as proxy for ground truths.

The result is shown in FIG. 8 where top plot 802 is based on the output of the Multinomial-Dirichlet model that is a lightweight model commonly used in industry. The bottom plot 804 is based on the output of the described present method. Comparing the two plots, shows that the number of alerts associated with classified legitimate users (the central line) significantly decreases. In other words, much fewer false alerts are being reported. Meanwhile, the classified legitimate users have a larger gap with the classified anomalous users in number of alerts.

Ablation studies were conducted on various modules/elements of the present anomaly detection framework. The ablation studies include: (1) replacing the proposed negative sampling algorithm by the standard negative sampling used in previous works, as introduced above; (2) removing features engineered based on the TLS representation of the dynamic history; (3) removing features engineered based on the AGS representation of the dynamic history; and (4) replacing the XGBoost classifier by logistic regression.

The results of the ablations are shown in Table 3. Observation shows that removing either TLS-based features or AGS-based features would hurt performance significantly. This shows the importance of combining both representations of dynamic histories in the anomaly detection modeling. In contrast, replacing XGBoost by logistic regression has the least influence on performance, showing that the downstream model is relatively less important compared to the modules.

TABLE 3

| Ablation | FP | Acc | AP |
|---|---|---|---|
| (0) No ablation | 4.96 | 96.08 | 94.52 |
| (1) Using old protocol for negative sampling | 6.32 | 93.96 | 92.00 |
| (2) Removing TLS-based features | 9.17 | 92.07 | 89.63 |
| (3) Removing AGS-based features | 7.55 | 94.11 | 93.18 |
| (4) Replacing XGBoost by logistic regression | 5.69 | 95.37 | 94.25 |

The description includes novel anomaly detection framework 200 for reducing false positives in authentication alerts in security systems. The novel anomaly detection framework utilizes both stream and graph snapshot views to capture the behavioral heterogeneity of network entities. This dual perspective, along with a refined negative sampling technique called "filtered rewiring," significantly improves the false positive rate in alerts. The anomaly detection framework is rigorously evaluated on extensive datasets, demonstrating a marked superiority over existing methods.

Several malicious authentication detection implementations are described in detail above. FIG. 9 shows a flowchart of an additional example method 900 that is consistent with the description above.

At block 902, the method can receive network data relating to past timestamped authentication events between network users and network devices. In some implementations the receiving network data can entail receiving a temporal graph that represents individual authentication events as edges between user nodes and device nodes. In other cases, the receiving can entail creating the temporal graph. In either case, the temporal graph can include relative orders that authentication events occur. For instance, the temporal graph can entail a dynamically-evolving bipartite graph in which each edge represents an individual authentication event between an individual user and an individual device.

At block 904, the method can extract graphical features from the timestamped authentication events. For instance, the graphical features can include an edge between an individual user and an individual device.

At block 906, the method can extract temporal features from the timestamped authentication events. In some cases, extracting temporal features can entail extracting temporal features relating to date, day, and time of individual authentication events between an individual user and an individual device/machine. In some cases, in addition to extracting graphical and temporal features, the process can further entail synthesizing fake (e.g., negative) timestamped authentication events. This can be accomplished with filtered rewiring, among other techniques.

At block 908, the method can train a temporal graph authentication anomaly detection model with both the extracted graphical features and the extracted temporal features. In some cases, training entails training the temporal graph authentication anomaly detection model with both the timestamped authentication events and the fake (e.g., synthesized) timestamped authentication events.

At block 910, the method can supply a subsequent timestamped authentication event to the trained temporal graph authentication anomaly detection model to determine whether the subsequent timestamped authentication event is a legitimate authentication event or a malicious authentication event. In some cases, the supplying is performed in real-time on authentication events as they occur. The authentication events can be supplied to and evaluated by the trained temporal graph authentication anomaly detection model to determine whether they are authentic or malicious.

At block 912, the method can receive an indication from the temporal graph authentication anomaly detection model whether the subsequent timestamped d authentication legitimate authentication event or a malicious authentication event.

At block 914, the method can control the network based on the received indication that the subsequent timestamped authentication event is a legitimate authentication event or a malicious authentication event. In cases where the subsequent timestamped authentication event is a legitimate authentication event, network communication between the user and the device can be allowed. In cases where the subsequent authentication event is deemed to be malicious by the trained temporal graph authentication anomaly detection model, the process can implement various network security protocols to protect network and/or data security. For instance, the access between the user and the device could be blocked or disallowed. Another action can include blocking the user (e.g., locking the user out of the network)

until an investigation can be completed to learn more information about the user (e.g., fake user or hijacked user) and/or the authentication (e.g., maybe system maintenance caused the user to contact an individual device at a time that was unusual).

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 10:
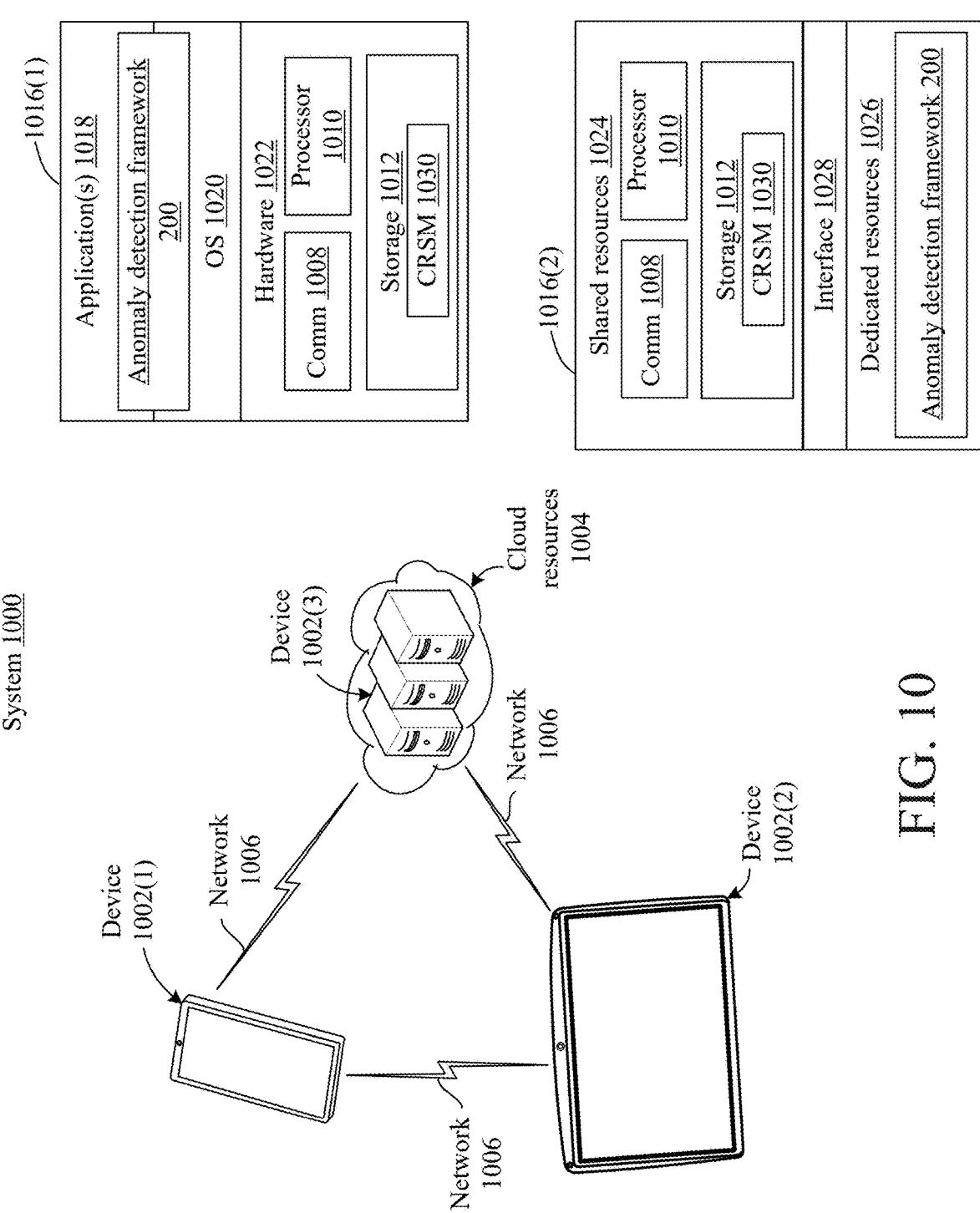
FIG. 10 illustrates an example system that is consistent with some implementations of the present concepts.

FIG. 10 shows an example system 1000. System 1000 can include computing devices 1002. In the illustrated configuration, computing device 1002(1) is manifest as a smartphone, computing device 1002(2) is manifest as a tablet type device, and computing device 1002(3) is manifest as a server type computing device, such as may be found in a datacenter as a cloud resource 1004. Computing devices 1002 can be coupled via one or more networks 1006 that are represented by lightning bolts.

Computing devices 1002 can include a communication component 1008, a processor 1010, storage resources (e.g., storage) 1012, and/or anomaly detection framework 200.

The anomaly detection framework 200 can be configured to generate negative authentication events for training purposes. The anomaly detection framework 200 can train the anomaly detection model with (positive) authentication events and the generated negative authentication events. The trained anomaly detection model can then be used in real-time on subsequent authentication events to determine whether they are legitimate or nefarious.

The anomaly detection framework 200 can also generate various user interfaces (UIs). For instance, the UIs can allow the user to supply the historical network information (e.g., authentication events). The UIs may also allow the user to create a feed of subsequent authentication events to the trained anomaly detection model. The UIs may display results from the trained anomaly detection model characterizing the subsequent authentication events. The displayed results may indicate a range or probability of a subsequent authentication event being anomalous. For instance, the results may be presented with a value from a range, such as 1 to 10, with 1 being least likely to be anomalous and 10 being highest likelihood of being anomalous.

The UIs may also allow the user, such as an administrator, to set various security actions to be performed when a malicious authentication event is detected by the trained anomaly detection model. For instance, the administrator may be able to set an action to be taken for a subsequent authentication event that receives a score of 5-7 and a different action to be taken for scores above 7, for instance. For example, the administrator may set parameters for values of 5-7 that allow the authentication event to be completed but with limited functionality and to automatically block authentication events with a value of higher than 7, for instance. Further, those authentication events in the higher range (e.g., 7-10) could be assigned higher importance for administrative review and those from lower ranges could be assigned lower importance, for example.

FIG. 10 shows two device configurations 1016 that can be employed by computing devices 1002. Individual computing devices 1002 can employ either configuration 1016(1) or 1016(2), or an alternate configuration. (Due to space constraints on the drawing page, one instance of each configuration is illustrated). Briefly, device configuration 1016(1) represents an operating system (OS) centric configuration. Device configuration 1016(2) represents a system on a chip (SOC) configuration. Device configuration 1016(1) is organized into one or more applications 1018, operating system 1020, and hardware 1022. Device configuration 1016(2) is organized into shared resources 1024, dedicated resources 1026, and an interface 1028 therebetween.

In configuration 1016(1), the anomaly detection framework 200 can be manifest as part of the operating system 1020. Alternatively, the anomaly detection framework 200 can be manifest as part of the applications 1018 that operate in conjunction with the operating system 1020 and/or processor 1010. In configuration 1016(2), the anomaly detection framework 200 can be manifest as part of the processor 1010 or a dedicated resource 1026 that operates cooperatively with the processor 1010.

In some configurations, each of computing devices 1002 can have an instance of the anomaly detection framework 200. However, the functionalities that can be performed by the anomaly detection framework 200 may be the same or they may be different from one another when comparing computing devices. For instance, in some cases, each anomaly detection framework 200 can be robust and provide all of the functionality described above and below (e.g., a device-centric implementation).

In other cases, some devices can employ a less robust instance of the anomaly detection framework 200 that relies on some functionality to be performed by an anomaly detection framework 200 on another device.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on/in storage, such as storage that can be internal or external to the device and is configured to store the data. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" (CRSM) 1030 excludes signals. Computer-readable storage media 1030 includes "computer-readable storage devices." Examples of computer-readable storage devices include volatile storage media, such as RAM, and non-volatile storage media, such as hard drives, optical discs, and flash memory, among others.

As mentioned above, device configuration 1016(2) can be viewed of as a system on a chip (SOC) type design. In such a case, functionality provided by the device can be integrated on a single SOC or multiple coupled SOCs. One or more processors 1010 can be configured to coordinate with shared resources 1024, such as storage 1012, etc., and/or one or more dedicated resources 1026, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Terminology

For the purposes of this document, the term "language model" refers to any type of automated agent that communicates via natural language. For instance, a language model can be implemented as a neural network, e.g., a decoder-based generative language model such as ChatGPT, a long short-term memory model, etc. The term "generative model," as used herein, refers to a machine learning model employed to generate new content. Generative models can be trained to predict items in sequences of training data. When employed in inference mode, the output of a generative model can include new sequences of items that the model generates. Thus, a "generative language model" is a model that can generate new sequences of text given some input prompt, e.g., a query potentially with some additional context.

The term "prompt," as used herein, refers to input text provided to a generative language model that the generative language model uses to generate output text. A prompt can include a query, e.g., a request for information from the generative language model. A prompt can also include context, or additional information that the generative language model uses to respond to the query.

The term "data health issue" refers to any characteristic of a dataset that could impact results of processing that dataset. Examples of data health issues include the presence of corrupted data, erroneous data, improperly formatted data, statistical outliers, etc. The term "data evaluation action" refers to any action performed on a dataset that can identify a data health issue. A "data evaluation plan" is one or more data evaluation actions that can be performed on a given dataset. A "data cleaning action" is an action that attempts to improve data quality by correcting at least one data health issue, e.g., by removing an entry or value from a dataset, changing a value in the dataset to a different value, etc.

A "summary" of a dataset refers to a representation of the dataset as a whole. A summary of a dataset can include data types of fields of the dataset, statistical information for fields of the dataset, and/or annotations of individual fields of the dataset, a set of fields of the dataset, or the dataset as a whole. A "data health score" refers to any metric that characterizes the presence of data health issues in a dataset. A "severity dictionary" is one or more indications of how severe a particular type of data health issue is when present in a dataset. For instance, a severity dictionary can indicate that missing values are relatively more severe than statistical outliers, and can include weights designating the relative severity of each.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards. The term "user-specific model" refers to a model that has at least one component that has been trained or constructed at least partially for a specific user. Thus, this term encompasses models that have been trained entirely for a specific user, models that are initialized using multi-user data and tuned to the specific user, and models that have both generic components trained for multiple users and one or more components trained or tuned for the specific user. Likewise, the term "application-specific model" refers to a model that has at least one component that has been trained or constructed at least partially for a specific application.

The term "pruning" refers to removing parts of a machine learning model while retaining other parts of the machine learning model. For instance, a large machine learning model can be pruned to a smaller machine learning model for a specific task by retaining weights and/or nodes that significantly contribute to the ability of that model to perform a specific task, while removing other weights or nodes that do not significantly contribute to the ability of that model to perform that specific task. A large machine learning model can be distilled into a smaller machine learning model for a specific task by training the smaller machine learning model to approximate the output distribution of the large machine learning model for a task-specific dataset.

Example Decoder-Based Language Model

Figure 11:
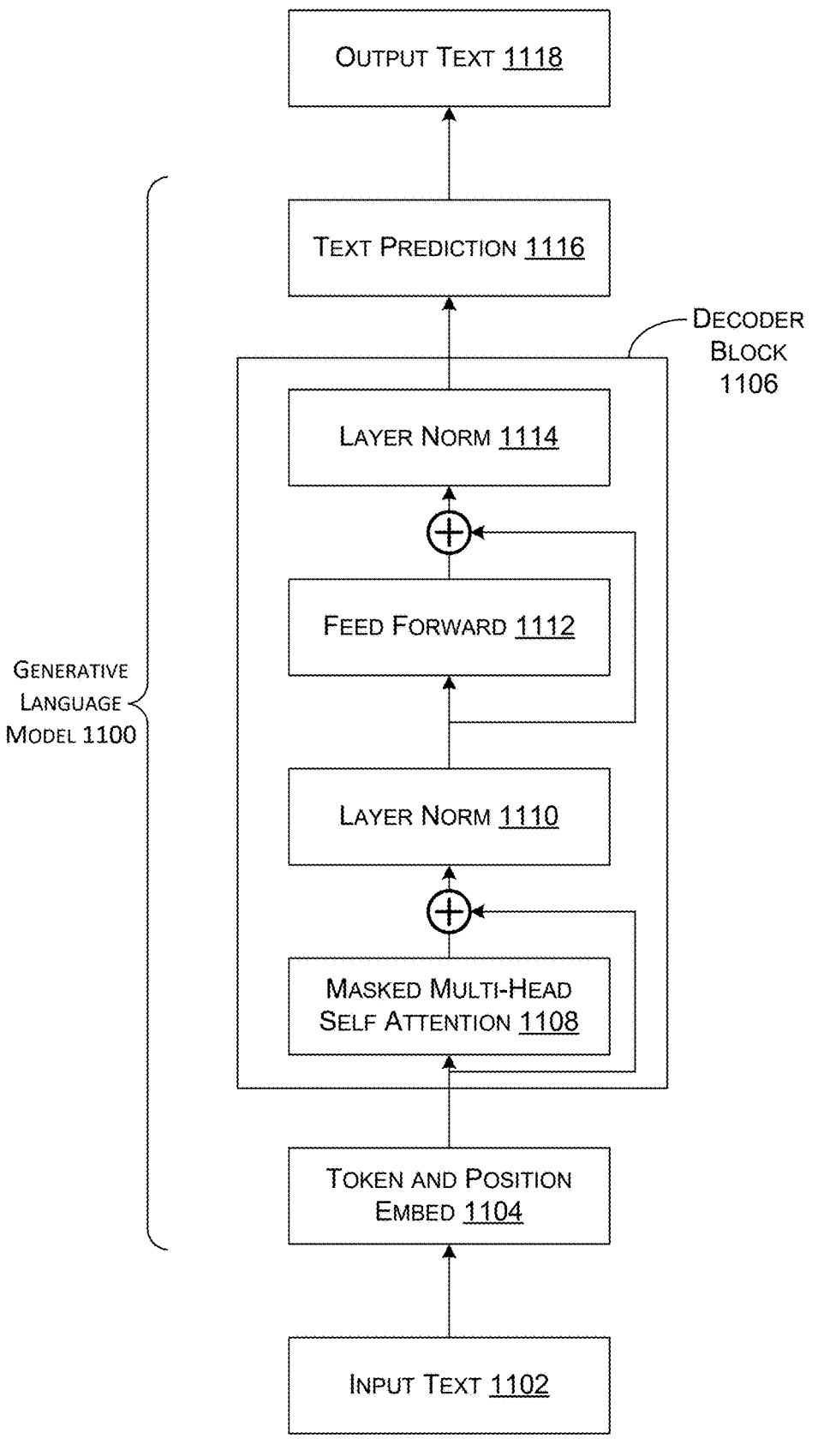
FIG. 11 illustrates an example generative language model that is consistent with some implementations of the present concepts.

FIG. 11 illustrates an example general artificial intelligence model, such as generative language model 1100 that can be employed using the disclosed implementations. Generative language model 1100 is an example of a machine learning model that can be used to perform one or more natural language processing tasks that involve generating text, as discussed more below. For the purposes of this document, the term "natural language" means language that is normally used by human beings for writing or conversation.

Generative language model 1100 can receive input text 1102, e.g., a prompt from a user. For instance, the input text can include words, sentences, phrases, or other representations of language. The input text can be broken into tokens and mapped to token and position embeddings 1104 representing the input text. Token embeddings can be represented in a vector space where semantically-similar and/or syntactically-similar embeddings are relatively close to one another, and less semantically-similar or less syntactically-similar tokens are relatively further apart. Position embeddings represent the location of each token in order relative to the other tokens from the input text.

The token and position embeddings 1104 are processed in one or more decoder blocks 1106. Each decoder block implements masked multi-head self-attention 1108, which is a mechanism relating different positions of tokens within the input text to compute the similarities between those tokens.

Each token embedding is represented as a weighted sum of other tokens in the input text. Attention is only applied for already-decoded values, and future values are masked. Layer normalization 1110 normalizes features to mean values of 0 and variance to 1, resulting in smooth gradients. Feed forward layer 1112 transforms these features into a representation suitable for the next iteration of decoding, after which another layer normalization 1114 is applied. Multiple instances of decoder blocks can operate sequentially on input text, with each subsequent decoder block operating on the output of a preceding decoder block. After the final decoding block, text prediction layer 1116 can predict the next word in the sequence, which is output as output text 1118 in response to the input text 1102 and also fed back into the language model. The output text can be a newly-generated response to the prompt provided as input text to the generative language model.

Additional Examples

Various examples are described above. Additional examples are described below. One example includes a device-implemented method comprising receiving network data relating to past timestamped authentication events between network users and network devices, extracting graphical features from the timestamped authentication events, extracting temporal features from the timestamped authentication events, training a temporal graph authentication anomaly detection model with both the extracted graphical features and the extracted temporal features, and supplying a subsequent timestamped authentication event to the trained temporal graph authentication anomaly detection model to determine whether the subsequent timestamped authentication event is a legitimate authentication event or a malicious authentication event.

Another example can include any of the above and/or below examples where receiving network data comprises receiving a temporal graph that represents individual authentication events as edges between user nodes and device nodes.

Another example can include any of the above and/or below examples where the temporal graph includes relative orders that authentication events occur.

Another example can include any of the above and/or below examples where the temporal graph comprises a dynamically-evolving bipartite graph in which each edge represents an individual authentication event between an individual user and an individual device.

Another example can include any of the above and/or below examples where extracting temporal features comprises extracting temporal features relating to date, day, and time of individual authentication events.

Another example can include any of the above and/or below examples where the method further comprises synthesizing fake timestamped authentication events.

Another example can include any of the above and/or below examples where synthesizing fake timestamped authentication events comprises filtered rewiring.

Another example can include any of the above and/or below examples where the training comprises training the temporal graph authentication anomaly detection model with both the timestamped authentication events and the fake timestamped authentication events.

Another example can include any of the above and/or below examples where the method further comprises receiving an indication that the subsequent timestamped authentication event is a malicious authentication event.

Another example can include any of the above and/or below examples where the method further comprises taking an action to protect network security based upon the indication of the malicious authentication event from the trained temporal graph authentication anomaly detection model.

Another example can include any of the above and/or below examples where supplying a subsequent timestamped authentication event comprises monitoring network authentication events in real-time and implementing a network security protocol responsive to the malicious authentication event.

Another example includes a system comprising hardware and an anomaly detection framework configured to receive network data relating to past timestamped authentication events between network users and network devices on a network, extract graphical features from the timestamped authentication events, extract temporal features from the timestamped authentication events relating to date, day, and time of individual authentication events, train a temporal graph authentication anomaly detection model with both the extracted graphical features and the extracted temporal features, supply a subsequent timestamped authentication event to the trained temporal graph authentication anomaly detection model to determine whether the subsequent timestamped authentication event is a legitimate authentication event or a malicious authentication event, receive an indication from the temporal graph authentication anomaly detection model whether the subsequent timestamped authentication event is a legitimate authentication event or a malicious authentication event, and control the network base on the received indication that the subsequent timestamped authentication event is a legitimate authentication event or a malicious authentication event.

Another example can include any of the above and/or below examples where the anomaly detection framework includes the temporal graph authentication anomaly detection model or wherein the anomaly detection framework communicates with the temporal graph authentication anomaly detection model.

Another example can include any of the above and/or below examples where the anomaly detection framework is configured to generate negative authentication event samples for training the temporal graph authentication anomaly detection model.

Another example can include any of the above and/or below examples where the anomaly detection framework is configured to generate negative authentication event samples utilizing filtered rewiring.

Another example can include any of the above and/or below examples where the filtered rewiring utilizes a user node and machine node from an individual authentication event and creates a negative training node by randomly sampling a new timestamp for the individual authentication event, changing the user node to a different user node, or changing the machine node to a different machine node.

Another example includes a system comprising a storage configured to store, an anomaly detection framework configured to accomplish train links generation to generate a set of positive and negative authentication training events, dual history extraction configured to extract dynamic history for time-respected local sub-streams of individual training events and aggregated graph snapshots for the positive and negative authentication training events, feature engineering configured to convert the extracted dynamic history and aggregated graph snapshots into numerical features, and train an anomaly detection model with the numerical features of the positive and negative authentication training events.

Another example can include any of the above and/or below examples where the numerical features are represented in a dynamically-evolving bipartite graph.

Another example can include any of the above and/or below examples where the system further comprises supplying a subsequent authentication event to the trained anomaly detection model.

Another example can include any of the above and/or below examples where the system further comprises allowing or disallowing the subsequent authentication event based upon output of the trained anomaly detection model.

Conclusion

The description includes network authentication anomaly detection concepts. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device-implemented method comprising:
   receiving network data as a bipartite graph relating to past timestamped authentication events between network users and network devices in which each edge represents an individual past timestamped authentication event between an individual user and an individual device;
   extracting graphical features from the past timestamped authentication events;
   extracting temporal features from the past timestamped authentication events;
   synthesizing fake malicious authentication events by changing the graphical features in individual past timestamped authentication events and by changing the temporal features in other individual past timestamped authentication events;
   training a temporal graph authentication anomaly detection model with both the graphical features and the temporal features of the past timestamped authentication events and with the synthesized fake malicious authentication events; and,
   supplying a subsequent timestamped authentication event to the trained temporal graph authentication anomaly detection model to determine whether the subsequent timestamped authentication event is a legitimate authentication event or a malicious authentication event.

2. The method of claim 1, wherein the bipartite graph comprises a dynamically-evolving bipartite graph.

3. The method of claim 2, wherein the dynamically-evolving bipartite graph includes relative orders that the past timestamped authentication events occur.

4. The method of claim 1, wherein extracting temporal features comprises extracting temporal features relating to date, day, and time of individual past timestamped authentication events.

5. The method of claim 4, wherein changing the temporal features in synthesized fake malicious authentication events comprises changing the date, the day, and/or the time of other individual past timestamped authentication events.

6. The method of claim 1, wherein synthesizing negative timestamped authentication events comprises filtered rewiring.

7. The method of claim 6, wherein the training comprises training the temporal graph authentication anomaly detection model with both the past timestamped authentication events and the synthesized fake malicious authentication events.

8. The method of claim 1, further comprising receiving an indication from the trained temporal graph authentication anomaly detection model that the subsequent timestamped authentication event is a malicious authentication event.

9. The method of claim 8, further comprising taking an action to protect network security based upon the indication of the malicious authentication event from the trained temporal graph authentication anomaly detection model.

10. The method of claim 1, wherein supplying a subsequent timestamped authentication event comprises monitoring network authentication events in real-time and implementing a network security protocol responsive to the malicious authentication event.

11. A system, comprising:

hardware; and, an anomaly detection framework configured to receive network data relating to past timestamped authentication events between network users and network devices on a network, extract graphical features relating to network users and network devices from the past timestamped authentication events, extract temporal features from the past timestamped authentication events relating to date, day, and time of the past authentication events, synthesize malicious authentication events utilizing filtered rewiring by changing either the network users or the network devices of individual past timestamped authentication events but maintaining temporal features and synthesize other malicious authentication events by changing the temporal features of other individual past timestamped authentication events but maintaining the network users and the network devices, train a temporal graph authentication anomaly detection model with the past timestamped authentication events, the synthesized malicious authentication events and the other synthesized malicious authentication events, supply a subsequent timestamped authentication event to the trained temporal graph authentication anomaly detection model to determine whether the subsequent timestamped authentication event is a legitimate authentication event or a malicious authentication event, receive an indication from the trained temporal graph authentication anomaly detection model whether the subsequent timestamped authentication event is a legitimate authentication event or a malicious authentication event, and control the network based on the received indication that the subsequent timestamped authentication event is a legitimate authentication event or a malicious authentication event.

12. The system of claim 11, wherein the anomaly detection framework includes the temporal graph authentication anomaly detection model or wherein the anomaly detection framework communicates with the temporal graph authentication anomaly detection model.

13. The system of claim 11, wherein the anomaly detection framework is configured to generate time-respected local sub-streams and aggregated graph snapshots for each past timestamped authentication event and for each synthesized malicious authentication event.

14. A system, comprising:

a storage configured to store:

an anomaly detection framework configured to accomplish:

receive past authentication events relating to a network, the past authentication events including a user linked to a machine with a temporal component, treating the past authentication events as positive authentication training events, employing filtered rewiring on the past authentication events to synthesize malicious negative authentication training events by changing the user or the machine that are linked in individual past authentication events and maintaining the temporal component and changing the temporal component of other individual past authentication events and maintaining the user and the machine, train an anomaly detection model with the positive authentication training events and the synthesized malicious negative authentication training events, and analyze a subsequent authentication event with the trained anomaly detection model to determine whether the subsequent authentication event is a legitimate authentication event or a malicious authentication event.

15. The system of claim 14, wherein the anomaly detection framework is further configured to perform dual history extraction on the positive authentication training events and the synthesized negative training events to generate stream-based views and aggregated graph-based snapshot-based views.

16. The system of claim 14, further comprising allowing or disallowing the subsequent authentication event based upon output of the trained anomaly detection model.

\* \* \* \* \*